(12) United States Patent
Lee

(10) Patent No.: US 9,322,527 B2
(45) Date of Patent: Apr. 26, 2016

(54) LIGHT UNIT AND ILLUMINATION SYSTEM USING THE SAME

(71) Applicant: Ji in Lee, Seoul (KR)

(72) Inventor: Ji in Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 117 days.

(21) Appl. No.: 13/720,506

(22) Filed: Dec. 19, 2012

(65) Prior Publication Data

US 2013/0155676 A1    Jun. 20, 2013

(30) Foreign Application Priority Data

Dec. 20, 2011 (KR) .......................... 10-2011-0138082

(51) Int. Cl.
| | |
|---|---|
| G09F 13/04 | (2006.01) |
| F21V 7/00 | (2006.01) |
| F21V 7/22 | (2006.01) |
| F21V 8/00 | (2006.01) |
| G02F 1/1335 | (2006.01) |

(52) U.S. Cl.
CPC ............... *F21V 7/0025* (2013.01); *F21V 7/22* (2013.01); *G02B 6/0055* (2013.01); *G02F 1/133605* (2013.01); *G02F 1/133615* (2013.01)

(58) Field of Classification Search
CPC ............. F21Y 2101/02; G02B 6/0055; G02F 1/133605; G02F 1/133606
USPC .......................................... 362/97.1–97.3, 235
See application file for complete search history.

(56) References Cited

U.S. PATENT DOCUMENTS

| | | | |
|---|---|---|---|
| 2006/0203512 A1 | 9/2006 | Ko et al. ........................ | 362/609 |
| 2012/0250293 A1* | 10/2012 | Jeong et al. ................... | 362/97.2 |

FOREIGN PATENT DOCUMENTS

| | | |
|---|---|---|
| EP | 2 508 942 A1 | 10/2012 |
| WO | WO 2008/146229 A2 | 12/2008 |
| WO | WO 2010/029475 A1 | 3/2010 |

OTHER PUBLICATIONS

European Search Report dated Mar. 28, 2013 issued in Application No. 12 19 7685.6.

* cited by examiner

*Primary Examiner* — Sean Gramling
(74) *Attorney, Agent, or Firm* — KED & Associates LLP

(57) ABSTRACT

Disclosed are a light unit and an illumination system using the same. The light unit includes a top plate, a bottom plate, and at least one light source module located between the top plate and the bottom plate. The bottom plate includes a specular-reflection region and a diffuse-reflection region. The diffuse-reflection region includes a first reflective pattern that reflects incident light via Lambertian distribution and a second reflective pattern that reflects incident light via Gaussian distribution.

20 Claims, 17 Drawing Sheets

SPECULAR-REFLECTION REGION

DIFFUSE-REFLECTION REGION

LIGHT UNIT AND ILLUMINATION SYSTEM USING THE SAME

CROSS REFERENCE TO RELATED APPLICATION

This application claims priority under 35 U.S.C. §119 to Korean Patent Application No. 10-2011-0138082, filed in Korea on 20 Dec. 2011, which is hereby incorporated in its entirety by reference as if fully set forth herein.

TECHNICAL FIELD

Embodiments relate to a light unit and an illumination system using the same.

BACKGROUND

In general, representative large-scale display apparatuses may include Liquid Crystal Displays (LCDs) and Plasma Display Panels (PDPs), for example.

Unlike self-emission type PDPs, LCDs essentially need a separate light unit due to absence of self light emitting devices.

Light units for use in LCDs are classified into edge type light units and vertical type light units according to positions of light sources. In an edge type light unit, light sources are arranged at left and right edges or upper and lower edges of an LCD panel and a light guide plate is provided to uniformly distribute light throughout a surface of the LCD panel, which ensures uniform luminance and enables production of an extremely thin display panel.

A vertical type light unit is normally applied to displays of 20 inches or more. The vertical type light unit advantageously has greater light efficiency than the edge type light unit owing to a plurality of light sources being arranged below a panel and thus, is mainly used in a large-scale display requiring high luminance.

Conventional edge type or vertical type light units have adopted Cold Cathode Fluorescent Lamps (CCFL) as a light source.

The light units using CCFLs, however, have several disadvantages, such as consumption of a great quantity of power because power should always be applied to a CCFL, low color reproduction efficiency of about 70% that of a Cathode Ray Tube (CRT), and environmental pollution due to use of mercury.

Currently, light units using Light Emitting Diodes (LEDs) are being studied as a solution to the above described problems.

In the case of light units using LEDs, turning on or off a part of an LED array is possible, which can achieve remarkable reduction in power consumption. In particular, RGB LEDs exhibit color reproduction beyond 100% of a color reproduction range proposed by the National Television System Committee (NTSC) and can provide more vivid images to consumers.

SUMMARY

Embodiments provide a light unit which defines an air guide using a bottom plate having a specular-reflection region and a diffuse-reflection region without a reflection sheet, and an illumination system using the same.

In one embodiment, a light unit includes a top plate, a bottom plate, and at least one light source module located between the top plate and the bottom plate, wherein the bottom plate includes a specular-reflection region and a diffuse-reflection region, and the diffuse-reflection region includes a first reflective pattern that reflects incident light via Lambertian distribution and a second reflective pattern that reflects incident light via Gaussian distribution.

The diffuse-reflection region may occupy 50~95% of the entire area of the bottom plate.

The diffuse-reflection region may occupy 70~80% of the entire area of the bottom plate.

An area ratio of the specular-reflection region to the diffuse-reflection region of the bottom plate may be in a range of 1:1 to 1:20.

The first and second reflective patterns of the diffuse-reflection region may include irregularly-sized ridges.

A distance between the diffuse-reflection region of the bottom plate and the light source module may be greater than a distance between the specular-reflection region of the bottom plate and the light source module.

The bottom plate may include at least one flat surface, and the flat surface of the bottom plate may be parallel to the top plate.

The bottom plate may include at least two inclined surfaces having at least one inflection point, and first and second inclined surfaces, which are located next to each other about the inflection point, may have different radii of curvature.

The top plate may cover a portion of or the entire specular-reflection of the bottom plate, and the top plate may be the specular-reflection region.

In another embodiment, a light unit includes a top plate, a bottom plate, and at least one light source module located between the top plate and the bottom plate, wherein the bottom plate includes a specular-reflection region, a diffuse-reflection region, and a mixed region in which the specular-reflection region and the diffuse-reflection region are mixed, the specular-reflection region of the mixed region occupies 5~50% of the entire area of the mixed region, and the diffuse-reflection region includes a first reflective pattern that reflects incident light via Lambertian distribution and a second reflective pattern that reflects incident light via Gaussian distribution.

The mixed region may be located between the specular-reflection region and the diffuse-reflection region, and an area of the specular-reflection region of the mixed region may decrease with increasing distance from the light source module.

An area of the specular-reflection region included in the mixed region close to the light source module may be greater than an area of the specular-reflection region included in the mixed region distant from the light source module.

The specular-reflection region of the mixed region may occupy 20~30% of the entire area of the mixed region, and an area ratio of the specular-reflection region to the diffuse-reflection region of the mixed region may be in a range of 1:1 to 1:20.

In a further embodiment, a light unit includes a top plate, a bottom plate, and at least one light source module located between the top plate and the bottom plate, wherein the bottom plate includes a specular-reflection region and first and second diffuse-reflection regions, each of the first and second diffuse-reflection regions includes a first reflective pattern that reflects incident light via Lambertian distribution and a second reflective pattern that reflects incident light via Gaussian distribution, a size of the first reflective pattern in the first diffuse-reflection region is less than a size of the second reflective pattern, and a size of the first reflective pattern in the second diffuse-reflection region is greater than a size of the second reflective pattern.

An area ratio of the first diffuse-reflection region to the second diffuse-reflection region may be in a range of 1:1 to 1:5.

An area ratio of the specular-reflection region to the first diffuse-reflection region may be in a range of 1:1 to 1:4, and an area ratio of the specular-reflection region to the second diffuse-reflection region may be in a range of 1:1 to 1:20.

The first diffuse-reflection region may be located between the specular-reflection region and the second diffuse-reflection region.

In the above embodiments, the light unit may further include an optical member spaced apart from the bottom plate by a predetermined distance, and an air guide may be defined in a space between the bottom plate and the optical member.

BRIEF DESCRIPTION OF THE DRAWINGS

Arrangements and embodiments may be described in detail with reference to the following drawings in which like reference numerals refer to like elements and wherein.

DESCRIPTION OF SPECIFIC EMBODIMENTS

Hereinafter, embodiments will be described with reference to the annexed drawings.

It will be understood that when an element is referred to as being 'on' or "under" another element, it can be directly on/under the element, and one or more intervening elements may also be present.

Also, when an element is referred to as being 'on' or 'under', 'under the element' as well as 'on the element' can be included based on the element.

Figure 1A:
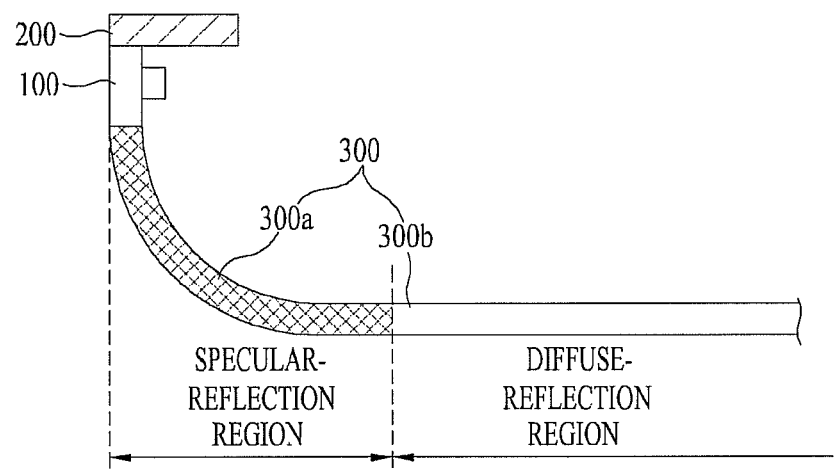
FIGS. 1A and 1B are explanatory views illustrating a light unit according to a first embodiment.
Figure 1B:
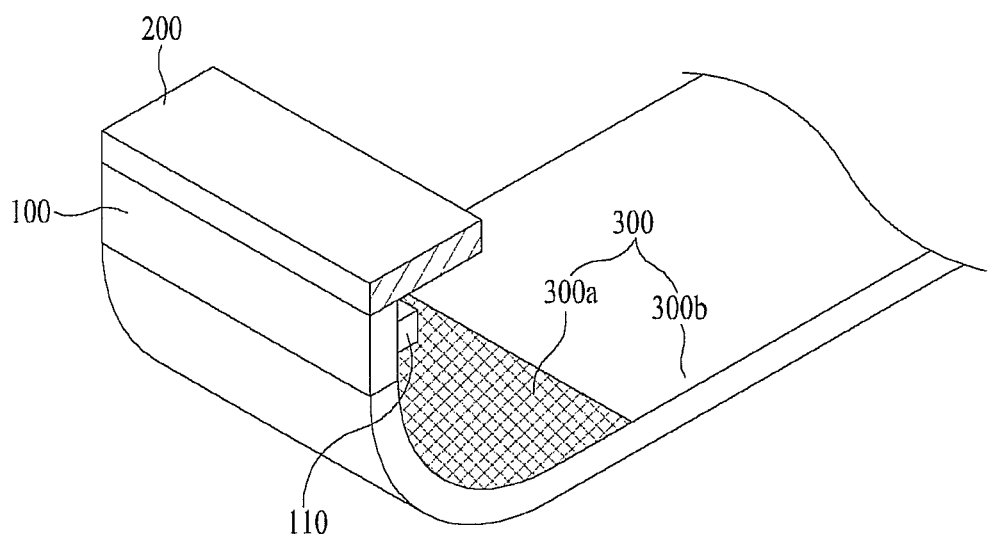

FIGS. 1A and 1B are explanatory views illustrating a light unit according to a first embodiment. FIG. 1A is a sectional view, and FIG. 1B is a top perspective view.

As illustrated in FIGS. 1A and 1B, the light unit may include a light source module 100 having at least one light source 110, a top plate 200, and a bottom plate 300.

The light source module 100 having the light source 110 may be provided between the top plate 200 and the bottom plate 300, and may be located close to the top plate 200 or the bottom plate 300.

As occasion demands, the light source module 100 may come into contact with the top plate 210 while being spaced apart from the bottom plate 300 by a predetermined distance, or the light source module 100 may come into contact with the bottom plate 300 while being spaced apart from the top plate 200 by a predetermined distance.

Alternatively, the light source module 100 may be spaced apart from the top plate 200 and the bottom plate 300 by predetermined distances, or may come into contact with both the top plate 200 and the bottom plate 300.

The light source module 100 may include a board having an electrode pattern, and at least one light source 110 placed on the board.

Here, the light source 110 of the light source module 100 may be a top view type light emitting diode.

As occasion demands, the light source 110 may be a side view type light emitting diode.

The board may be a Printed Circuit Board (PCB) formed of any one material selected from among polyethyleneterephthalate (PET), glass, polycarbondate (PC), and silicon (Si), and may take the form of a film.

Also, a single layer PCB, a multilayer PCB, a ceramic board, a metal core PCB, or the like may be selectively used as the board.

The board may be provided with any one of a reflective coating film and a reflective coating material layer, to reflect light emitted from the light source 110 to a central region of the bottom plate 300.

The light source 110 may be a Light Emitting Diode (LED) chip. The LED chip may be a blue LED chip or an ultraviolet LED chip, or may be a package combining at least one or more selected from among a red LED chip, a green LED chip, a blue LED chip, a yellow green LED chip, and a white LED chip.

A white LED may be realized by coupling a yellow phosphor to a blue LED, by coupling both red and green phosphors to a blue LED, or by coupling yellow, red and green phosphors to a blue LED.

The top plate 200 and the bottom plate 300 may be arranged to face each other and be spaced apart from each other by a predetermined distance. As such, instead of a conventional light guide plate, an air guide may be defined in a space between the top plate 200 and the bottom plate 300.

The top plate 200 may be formed of any one of a reflective coating film and a reflective coating material layer, and may serve to reflect light emitted from the light source module 100 toward the bottom plate 300.

A saw-toothed reflective pattern may be formed on a surface of the top plate 200 facing the light source module 100. The reflective pattern may be flat or may be curved.

The reason for providing the surface of the top plate 200 with the reflective pattern is to reflect light emitted from the light source module 100 to the central region of the bottom plate 300, thereby increasing luminance of a central region of the light unit.

The bottom plate 300 may include a specular-reflection region 300a and a diffuse-reflection region 300b.

The specular-reflection region 300a may perform specular-reflection of incident light, and the diffuse-reflection region 300b may perform diffuse-reflection of incident light. Reflectivity of the specular-reflection region 300a and the diffuse-reflection region 300b may be in a range of about 50% to 99.99%.

The diffuse-reflection region 300b may include at least one of a first reflective pattern that reflects incident light via Lambertian distribution and a second reflective pattern that reflects incident light via Gaussian distribution.

For example, the specular-reflection region 300a of the bottom plate 300 may be obtained by polishing the bottom plate 300, to have specular-reflection characteristics. The reflective patterns may be formed in the diffuse-reflection region 300b of the bottom plate 300 via a precise process, such as, for example, a masking process and an etching process, to have diffuse-reflection characteristics.

Thus, the first and second reflective patterns of the diffuse-reflection region 300b may be irregularly-sized roughened patterns.

The diffuse-reflection region 300b may occupy about 50% to 95% of the entire area of the bottom plate 300.

As occasion demands, the diffuse-reflection region 300b may occupy about 70% to 80% of the entire area of the bottom plate 300.

An area ratio of the specular-reflection region 300a to the diffuse-reflection region 300b of the bottom plate 300 may be in a range of 1:1 to 1:20.

The reason for determining the area ratio of the specular-reflection region 300a to the diffuse-reflection region 300b of the bottom plate 300 as described above is to reduce a luminance difference between a region of the bottom plate 300 close to the light source module 100 and a region of the bottom plate 300 distant from the light source module 100.

That is, uniform luminance may be accomplished by appropriately adjusting the area ratio of the specular-reflection region 300a to the diffuse-reflection region 300b of the bottom plate 300.

A distance between the diffuse-reflection region 300b of the bottom plate 300 and the light source module 100 may be greater than a distance between the specular-reflection region 300a of the bottom plate 300 and the light source module 100.

That is, the specular-reflection region 300a of the bottom plate 300 may be located close to the light source module 100, and the diffuse-reflection region 300b of the bottom plate 300 may be located distant from the light source module 100.

With this arrangement, the specular-reflection region 300a of the bottom plate 300 located close to the light source module 100 serves to reflect light emitted from the light source module 100 to a central region of the bottom plate 300, and the diffuse-reflection region 300b of the bottom plate 300 located in a central region of the bottom plate 300 serves to diffuse incident light.

At least one of the light source module 100 and the top plate 200 may overlap with the specular-reflection region 300a.

That is, only a portion of the top plate 200 may overlap with the specular-reflection region 300a of the bottom plate 300, or the top plate 200 may completely overlap with the specular-reflection region 300a.

The bottom plate 300 may include at least one inclined surface and at least one flat surface.

The inclined surface of the bottom plate 300 may have a predetermined inclination angle with respect to the top plate 200, and the flat surface of the bottom plate 300 may be parallel to the top plate 200.

Also, the entire inclined surface of the bottom plate 300 may be a specular-reflection region, or only a portion of the inclined surface of the bottom plate 300 may be a specular-reflection region. The inclined surface of the bottom plate 300 may overlap with at least one of the light source module 100 and the top plate 200.

Figure 2:
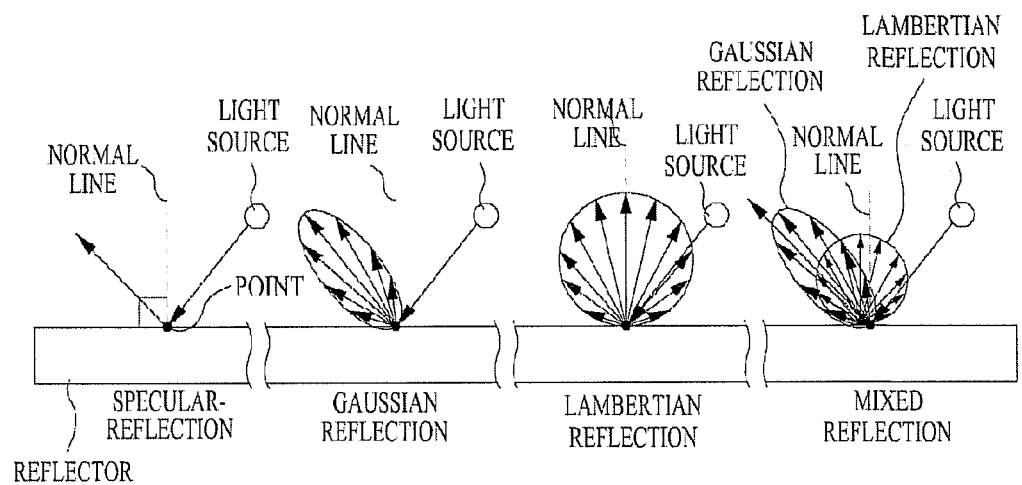
FIG. 2 is a view illustrating specular-reflection and diffuse-reflection characteristics of light.

FIG. 2 is a view illustrating specular-reflection and diffuse-reflection characteristics of light.

As illustrated in FIG. 2, light may undergo specular-reflection and diffuse-reflection according to surface properties of the bottom plate.

The diffuse-reflection may include Gaussian reflection, Lambertian reflection, and mixed reflection.

In general, specular-reflection refers to reflection in which when light is incident on any one point on a bottom plate, an angle between an optical axis of the incident light and a normal line that passes the corresponding point is equal to an angle between the normal line and an optical axis of reflected light.

Gaussian reflection refers to reflection in which the radiant intensity depending on a surface slant of a bottom plate is directly proportional to the Gaussian function of the angle between the surface normal and reflected light.

Lambertian reflection refers to reflection in which the radiant intensity depending on a surface slant of a bottom plate is directly proportional to the cosine of the angle between the surface normal and reflected light.

Mixed reflection refers to reflection in which at least one of specular reflection, Gaussian reflection and Lambertian reflection is mixed.

Accordingly, in the present embodiment, light reflection characteristics may be controlled by adjusting surface properties of the bottom plate 300.

Figure 3:
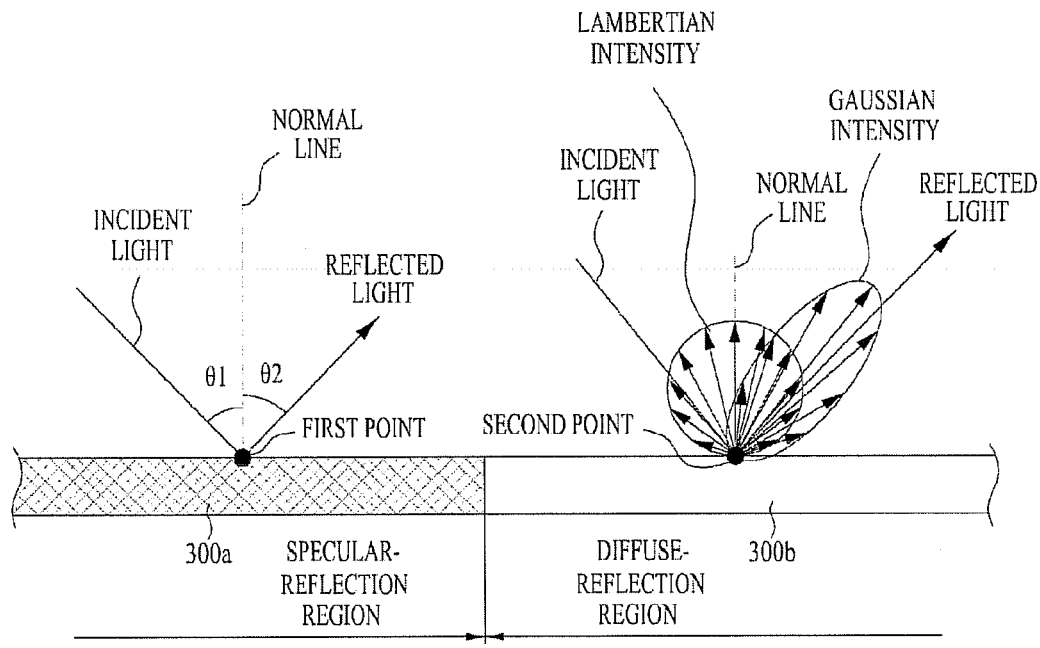
FIG. 3 is a view illustrating distribution of light reflected from a diffuse-reflection region of FIG. 1A.

FIG. 3 is a view illustrating distribution of light reflected from the diffuse-reflection region of FIG. 1A.

As illustrated in FIG. 3, in the specular-reflection region 300a of the bottom plate 300, when light is incident on a first point, an angle $\theta_1$ between an optical axis of the incident light and a normal line that passes the first point may be equal to an angle $\theta_2$ between the normal line and an optical axis of light reflected from the first point.

In the diffuse-reflection region 300b of the bottom plate 300, when light is incident on a second point, light reflected from the second point may exhibit at least one of Lambertian distribution and Gaussian distribution.

The second point may include at least one of a first reflective pattern that reflects incident light via Lambertian distribution and a second reflective pattern that reflects light via Gaussian distribution.

For example, the specular-reflection region 300a of the bottom plate 300 may be obtained by polishing the bottom plate 300, to have specular-reflection characteristics. The reflective patterns may be formed in the diffuse-reflection region 300b of the bottom plate 300 via a precise process, such as, for example, a masking process and an etching process, to have diffuse-reflection characteristics.

Thus, the first and second reflective patterns of the diffuse-reflection region 300b may be irregularly-sized roughened patterns.

The reason for fabricating the bottom plate 300 to have reflection characteristics is to reduce a luminance difference between a region of the bottom plate 300 close to the light source module 100 and a region of the bottom plate 300 distant from the light source module 100.

That is, the specular-reflection region 300a close to the light source module 100 may function to regularly reflect light to a central region of a light unit having low luminance, and the diffuse-reflection region 300b distant from the light source module 100 may diffusively reflect light so as to compensate for low luminance via diffuse-reflection.

As such, the entire bottom plate 300 may provide uniform luminance by appropriately adjusting reflection characteristics of the specular-reflection region 300a and the diffuse-reflection region 300b.

The bottom plate 300 may be formed of a metal or metal oxide having high reflectivity, such as aluminum (Al), silver (Ag), gold (Au) or titanium dioxide ($TiO_2$). The specular-reflection region 300a and the diffuse-reflection region 300b of the bottom plate 300 may be formed of the same material or different materials, and may have different surface roughness values.

More specifically, in the bottom plate 300, the specular-reflection region 300a and the diffuse-reflection region 300b may be formed of the same material, but may have different surface roughness values.

Alternatively, in the bottom plate 300, the specular-reflection region 300a and the diffuse-reflection region 300b may be formed of different materials and may have different surface roughness values.

Figure 4:
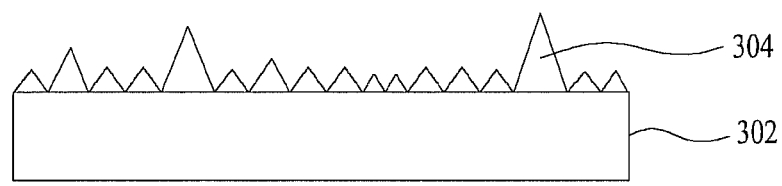
FIG. 4 is a sectional view illustrating a configuration of a diffuse-reflection region of a bottom plate.

FIG. 4 is a sectional view illustrating a configuration of the diffuse-reflection region of the bottom plate.

As illustrated in FIG. 4, the diffuse-reflection region of the bottom plate may take the form of a stack of a body layer 302 and a reflective pattern layer 304.

The reflective pattern layer 304 may be formed on a surface of the body layer 302 via a precise patterning process, such as a masking process and an etching process, for example.

In this case, the reflective pattern layer 304 may have a roughened shape, and ridges of the roughened pattern may have the same size or may have different sizes.

The reflective pattern layer 304 may occupy about 20~90% of the entire area of the body layer 302.

Also, ridges of the pattern may have a size in a range of about 5~50 μm.

As described above, reflection characteristics of the diffuse-reflection region 300b may be controlled by adjusting the size and number of ridges of the pattern included in the reflective pattern layer 304 of the diffuse-reflection region 300b.

Figure 5A:
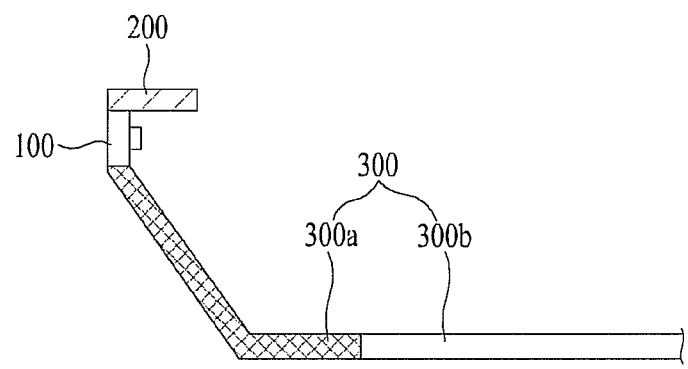
FIGS. 5A to 5C are views illustrating a bottom plate including an inclined surface and a flat surface.
Figure 5B:
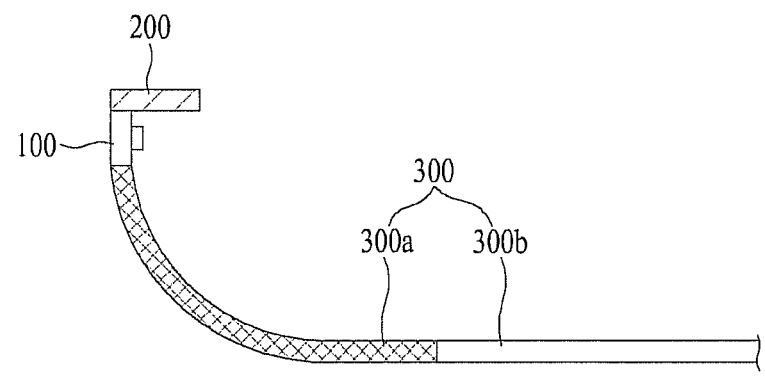
Figure 5C:
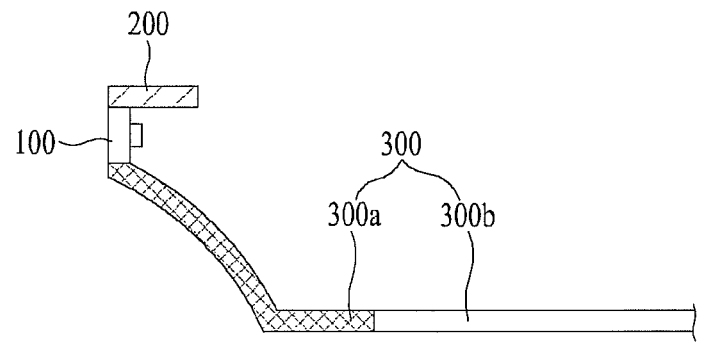

FIGS. 5A to 5C are views illustrating a bottom plate including an inclined surface and a flat surface.

In FIG. 5A, the specular-reflection region 300a of the bottom plate 300 may include an inclined surface, and the inclined surface may be flat.

In FIG. 5B, the specular-reflection region 300a of the bottom plate 300 may include an inclined surface, and the inclined surface may concavely curved. In FIG. 5C, the specular-reflection region 300a of the bottom plate 300 may include an inclined surface, and the inclined surface may be convexly curved.

As illustrated in FIGS. 5A to 5C, the diffuse-reflection region 300b of the bottom plate 300 may include a flat surface, and the flat surface may be parallel to the top plate 200.

Alternatively, the bottom plate 300 may include at least two inclined surfaces having at least one inflection point, and first and second inclined surfaces, which are located next to each other about the inflection point, may have different radii of curvatures.

Figure 6A:
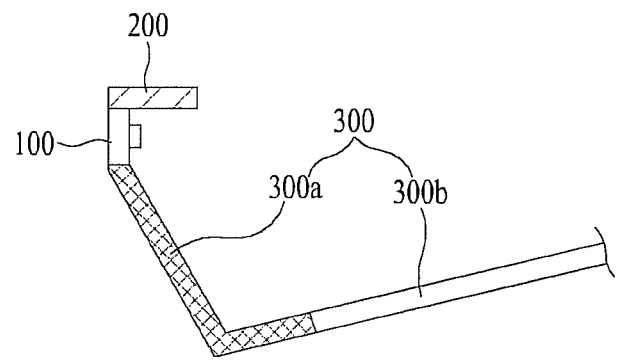
FIGS. 6A to 6C are views illustrating a bottom plate including a plurality of inclined surfaces.
Figure 6B:
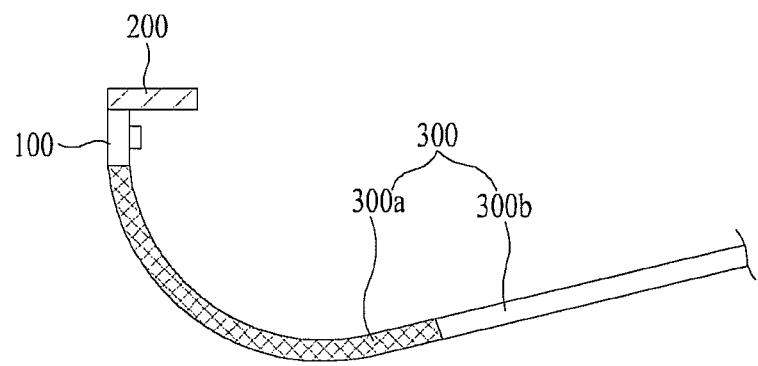
Figure 6C:
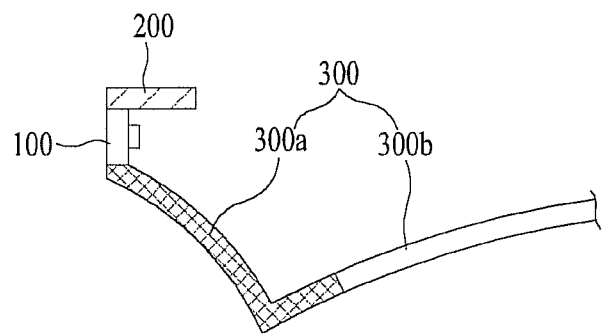

FIGS. 6A to 6C are views illustrating a bottom plate including a plurality of inclined surfaces.

In FIG. 6A, two inclined surfaces arranged next to each other may be flat, one inclined surface may be included in the specular-reflection region 300a of the bottom plate 300, and the other inclined surface may be included in the diffuse-reflection region 300b of the bottom plate 300.

As occasion demands, a portion of the specular-reflection region 300a of the bottom plate 300 may be provided with the same inclined surface as that provided in the diffuse-reflection region 300b.

In FIG. 6B, two inclined surfaces arranged next to each other may be concavely curved and may have different radii of curvatures. In FIG. 6C, two inclined surfaces arranged next to each other may be convexly curved and may have different radii of curvatures.

Here, one inclined surface may be included in the specular-reflection region 300a of the bottom plate 300, and the other inclined surface may be included in the diffuse-reflection region 300b of the bottom plate 300.

As occasion demands, a portion of the specular-reflection region 300a of the bottom plate 300 may be provided with the same inclined surface as that provided in the diffuse-reflection region 300b.

As described above, the inclined surface of the bottom plate 300 may be at least one of a concavely curved inclined surface, a convexly curved inclined surface, and a flat inclined surface.

Figure 7A:
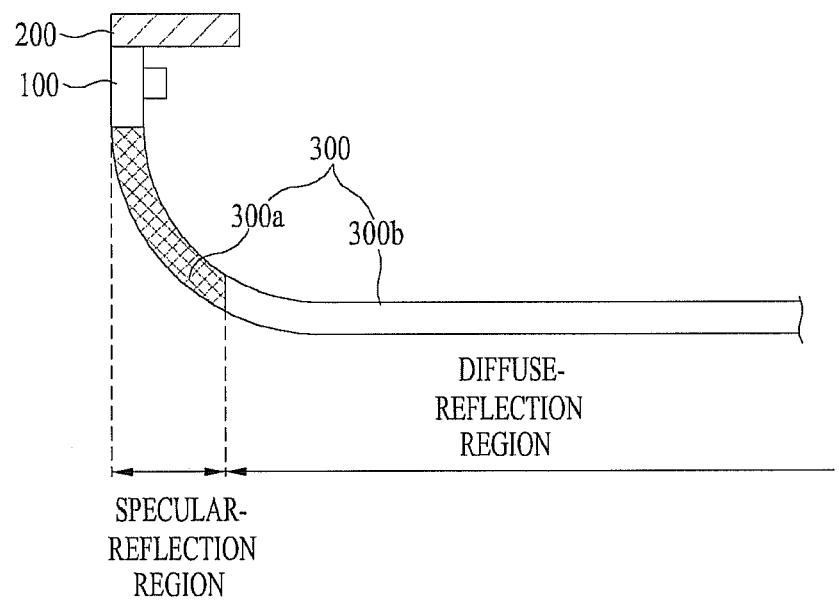
FIGS. 7A and 7B are views illustrating a top plate overlapped with a specular-reflection region of the bottom plate.
Figure 7B:
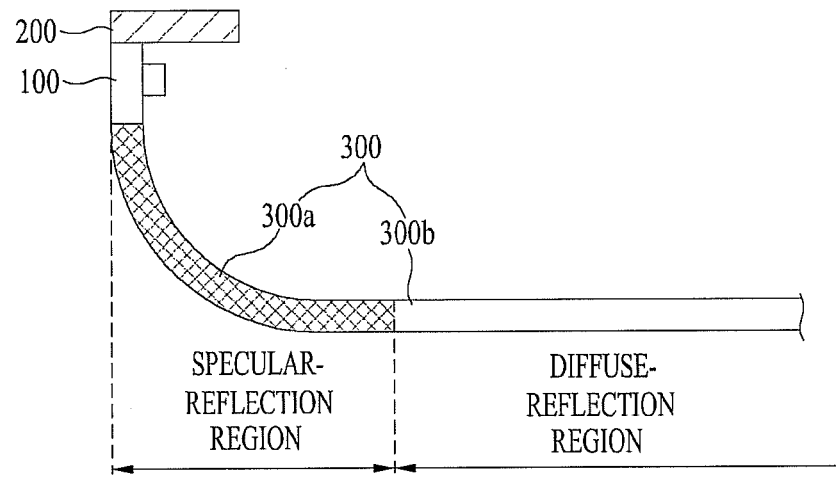

FIGS. 7A and 7B are views illustrating a top plate overlapped with the specular-reflection region of the bottom plate. FIG. 7A illustrates a top plate partially overlapped with the specular-reflection region of the bottom plate, and FIG. 7B illustrates a top plate completely overlapped with the specular-reflection region of the bottom plate.

As illustrated in FIG. 7A, only a portion of the top plate 200 may overlap with the specular-reflection region 300a of the bottom plate 300.

The light source module 100 may partially or wholly overlap with the specular-reflection region 300a of the bottom plate 300.

As illustrated in FIG. 7B, the top plate 200 may completely overlap with the specular-reflection region 300a of the bottom plate 300.

The light source module 100 may partially or wholly overlap with the specular-reflection region 300a of the bottom plate 300.

The top plate 200 may include a specular-reflection region, similar to the bottom plate 300.

FIGS. 8A to 8D are explanatory views illustrating a light unit according to a second embodiment.

As illustrated in FIGS. 8A to 8D, the bottom plate 300 may include a specular-reflection region, a diffuse-reflection region, and a mixed region in which a specular-reflection region and a diffuse-reflection region are mixed.

The specular-reflection region 300a of the mixed region may occupy about 5~50% of the entire area of the mixed region.

The diffuse-reflection region 300b may include a first reflective pattern that reflects incident light via Lambertian distribution and a second reflective pattern that reflects incident light via Gaussian distribution.

The mixed region may be located between the specular-reflection region 300a and the diffuse-reflection region 300b. An area of the specular-reflection region 300a in the mixed region may decrease with increasing distance from the light source module 100.

That is, in the mixed region, an area of the specular-reflection region 300a close to the light source module 100 may be greater than an area of the specular-reflection region 300a distant from the light source module 100.

The specular-reflection region 300a of the mixed region may occupy about 20~50% of the entire area of the mixed region.

An area ratio of the specular-reflection region 300a to the diffuse-reflection region 300b of the mixed region may be in a range of 1:1 to 1:20.

Figure 8A:
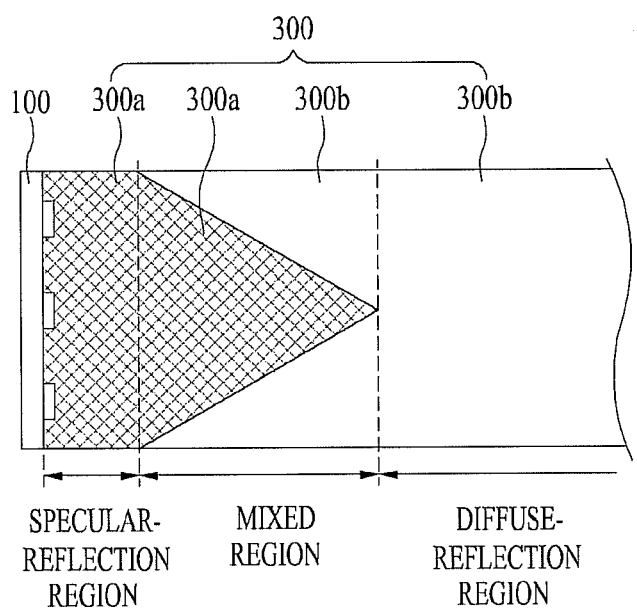
FIGS. 8A to 8D are explanatory views illustrating a light unit according to a second embodiment.
Figure 8B:
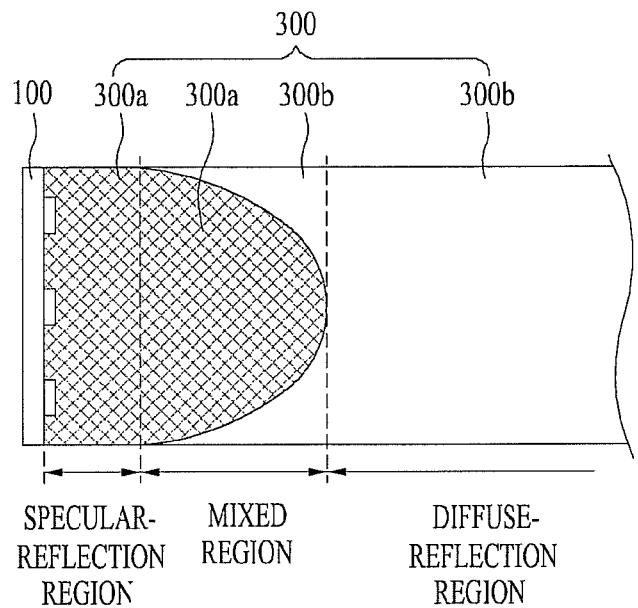
Figure 8C:
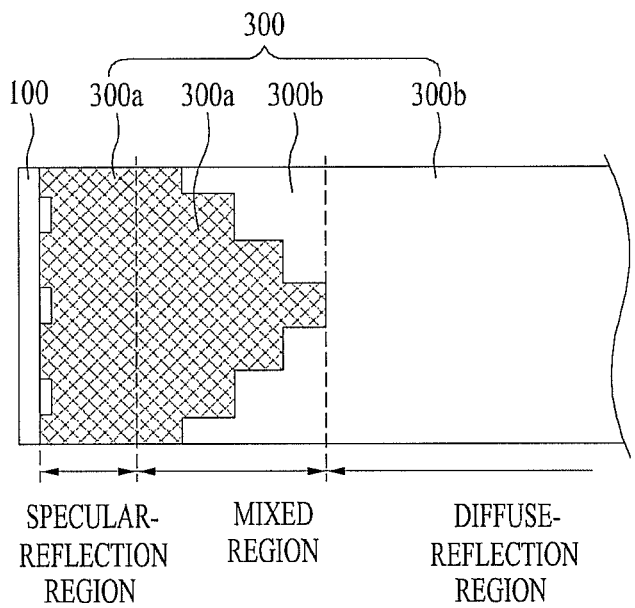
Figure 8D:
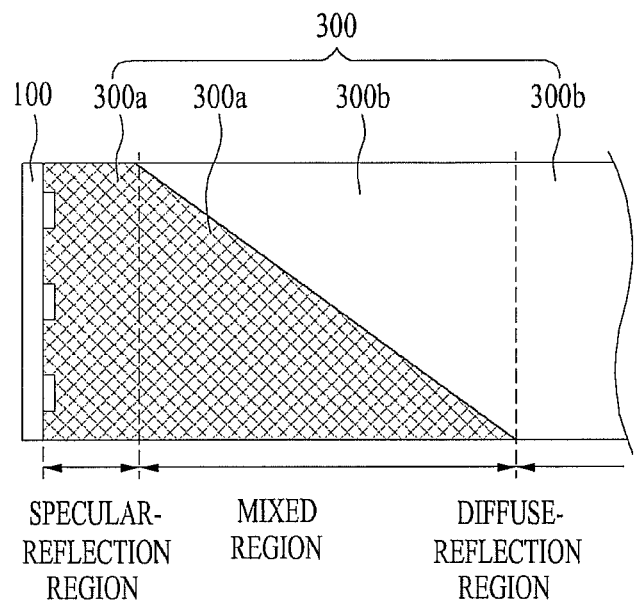

As illustrated in FIG. 8A, in the mixed region of the bottom plate 300, the specular-reflection region 300a may have a regular triangular shape. As illustrated in FIG. 8B, in the mixed region of the bottom plate 300, the specular-reflection region 300a may have a semi-circular shape. As illustrated in FIG. 8C, in the mixed region of the bottom plate 300, the specular-reflection region 300a may have a stepped triangular shape. As illustrated in FIG. 8D, in the mixed region of the bottom plate 300, the specular-reflection region 300a may have a right-angled triangular shape.

That is, in the mixed region of the bottom plate 300, the specular-reflection region 300a may gradually decrease in area with increasing distance from the light source module 100.

Also, in the mixed region of the bottom plate 300, the diffuse-reflection region 300b may gradually increase in area with increasing distance from the light source module 100.

As described above, the reason for decreasing an area of the specular-reflection region 300a of the bottom plate 300 with increasing distance from the light source module 100 is to prevent a black line from being generated at the boundary of the specular-reflection region 300a and the diffuse-reflection region 300b, thereby providing uniform luminance.

Figure 9A:
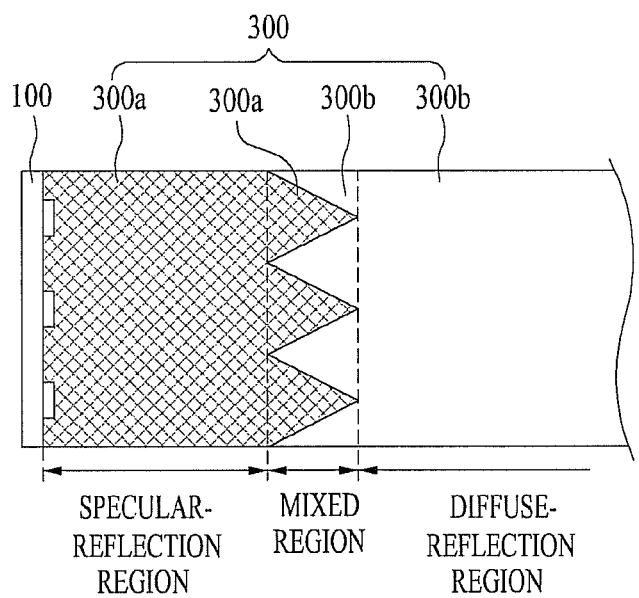
FIGS. 9A to 9C are plan views illustrating different embodiments of a mixed region according to the second embodiment.
Figure 9B:
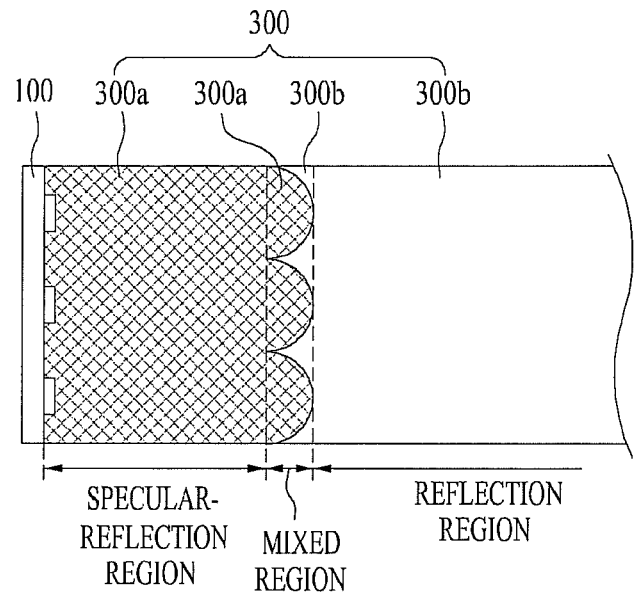
Figure 9C:
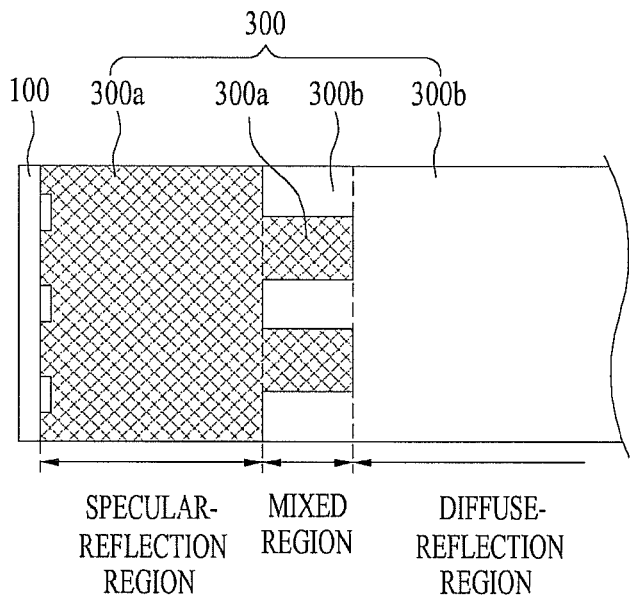

FIGS. 9A to 9C are plan views illustrating different embodiments of the mixed region according to the second embodiment.

As illustrated in FIG. 9A, in the mixed region of the bottom plate 300, the specular-reflection region 300a may take the form of a plurality of regular triangles. As illustrated in FIG. 9B, in the mixed region of the bottom plate 300, the specular-reflection region 300a may take the form of a plurality of semi-circles. As illustrated in FIG. 9C, in the mixed region of the bottom plate 300, the specular-reflection region 300a may take the form of a plurality of rectangles.

In the mixed region of the bottom plate 300, the specular-reflection region 300a and the diffuse-reflection region 300b may have the same area, and may have different areas, as occasion demands.

In the mixed region of the bottom plate 300, the specular-reflection region 300a may occupy about 20~50% of the entire area of the bottom plate 300.

As occasion demands, in the mixed region of the bottom plate 300, an area ratio of the specular-reflection region 300a to the diffuse-reflection region 300b may be in a range of about 1:1 to 1:20.

Alternatively, in the mixed region of the bottom plate 300, the diffuse-reflection region 300b may take the form of a plurality of dots included in the specular-reflection region 300a.

FIGS. 10, 11A, 11B, 12 and 13 are plan views illustrating other embodiments of the mixed region according to the second embodiment.

Figure 10:
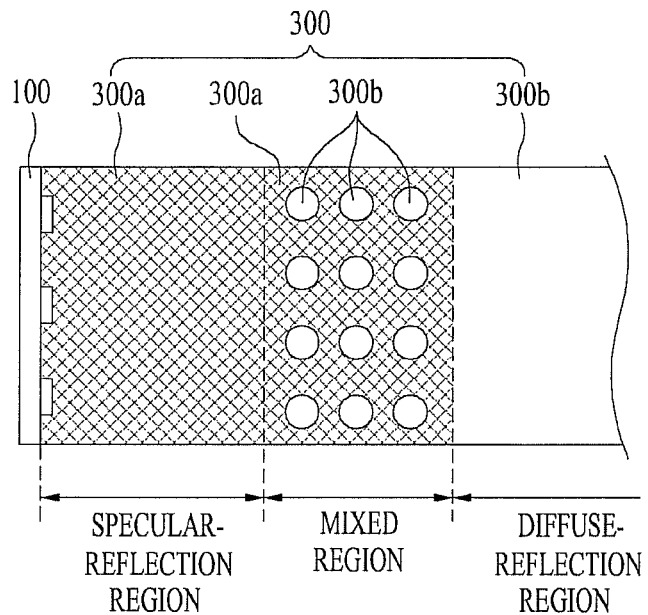
FIGS. 10, 11A, 11B, 12 and 13 are plan views illustrating other embodiments of the mixed region according to the second embodiment.

As illustrated in FIG. 10, in the mixed region of the bottom plate 300, the diffuse-reflection region 300b may take the form of a plurality of dots included in the specular-reflection region 300a. The number of dots may be constant in a region close to the light source module 100 and in a region distant from the light source module.

Figure 11A:
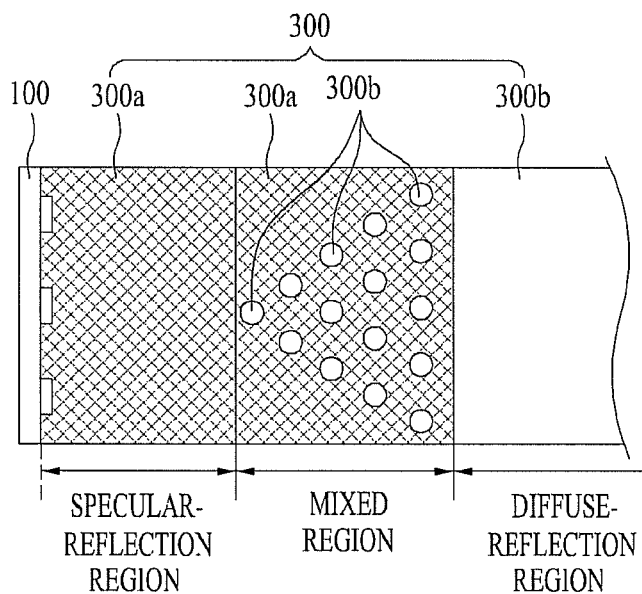

As occasion demands, as illustrated in FIG. 11A, in the mixed region of the bottom plate 300, the diffuse-reflection region 300b may take the form of a plurality of dots included in the specular-reflection region 300a. The number of dots may be different in a region close to the light source module 100 and in a region distant from the light source module 100.

That is, in the mixed region of the bottom plate 300, the diffuse-reflection region 300b in the form of dots may gradually increase in the number of dots with increasing distance from the light source module 100.

Figure 11B:
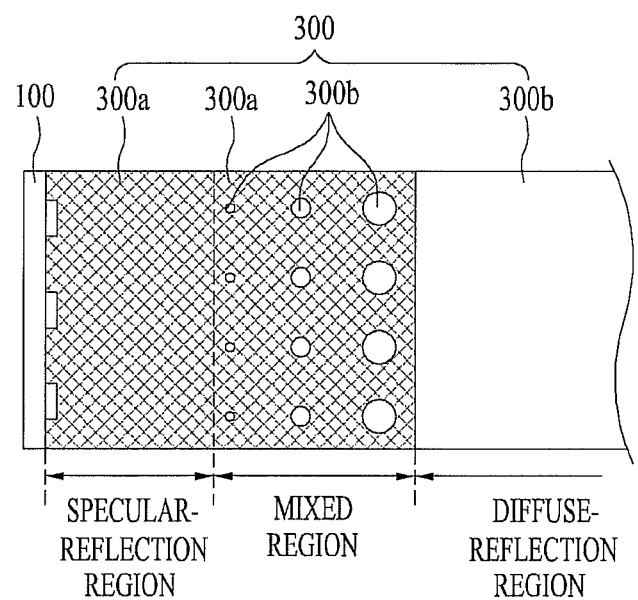

As occasion demands, as illustrated in FIG. 11B, in the mixed region of the bottom plate 300, the diffuse-reflection region 300b may take the form of a plurality of dots included in the specular-reflection region 300a. The size of dots may be different in a region close to the light source module 100 and in a region distant from the light source module 100.

That is, in the mixed region of the bottom plate 300, the diffuse-reflection region 300b in the form of dots may gradually increase in the size of dots with increasing distance from the light source module 100.

As described above, in the mixed region of the bottom plate 300, the diffuse-reflection region 300b in the form of dots may be constant in the number and size of dots with increasing distance from the light source module 100 as illustrated in FIG. 10. Alternatively, the diffuse-reflection region 300b in the form of dots may be constant in size, but may increase in number with increasing distance from the light source module 100 as illustrated in FIG. 11A, or may be constant in number, but may increase in size with increasing distance from the light source module 100 as illustrated in FIG. 11B.

The reason for adjusting the size and number of the diffuse-reflection region 300b in the form of dots is to provide uniform luminance throughout the mixed region of the bottom plate 300.

Figure 12:
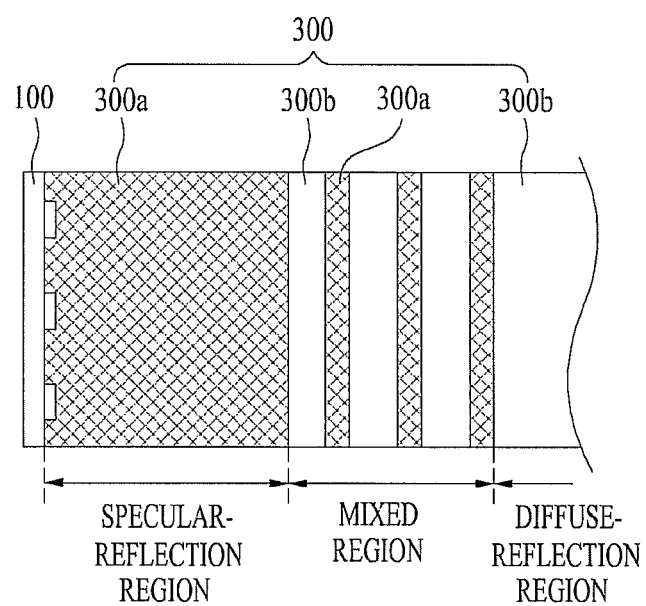
Figure 13:
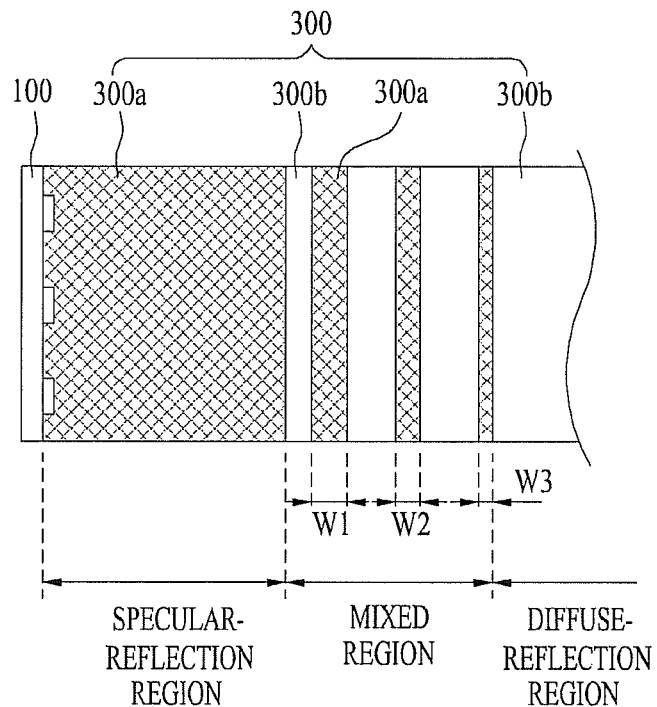

In other embodiments, as illustrated in FIGS. 12 and 13, in the mixed region of the bottom plate 300, the specular-reflection region 300a and the diffuse-reflection region 300b may take the form of stripes.

In this case, the specular-reflection region 300a and the diffuse-reflection region 300b may be alternately arranged, and widths of the stripes next to each other may be equal or different from each other.

As illustrated in FIG. 12, the specular-reflection region 300a may include a plurality of parallel stripes having the same width.

Also, the stripes of the specular-reflection region 300a may be arranged between the respective stripes of the specular-reflection region 300a.

The width of the stripes of the specular-reflection region 300a may be equal to or different from the width of the stripes of the diffuse-reflection region 300b.

As illustrated in FIG. 13, the specular-reflection region 300a may include a plurality of parallel stripes having different widths.

That is, the specular-reflection region 300a may gradually decrease in the width of the stripes with increasing distance from the light source module 100.

For example, a width w1 of the stripe of the specular-reflection region 300a close to the light source module 100 may be greater than a width w3 of the stripe of the specular-reflection region 300a distant from the light source module 100.

The stripes of the diffuse-reflection region 300b may be arranged between the respective stripes of the specular-reflection region 300a. A width of the stripe of the diffuse-reflection region 300b close to the light source module 100 may be less than a width of the stripe of the diffuse-reflection region 300b distant from the light source module 100.

As described above, the reason for adjusting the widths of the stripes of the specular-reflection region 300a and the diffuse-reflection region 300b is to provide uniform luminance throughout the mixed region of the bottom plate 300.

Figure 14A:
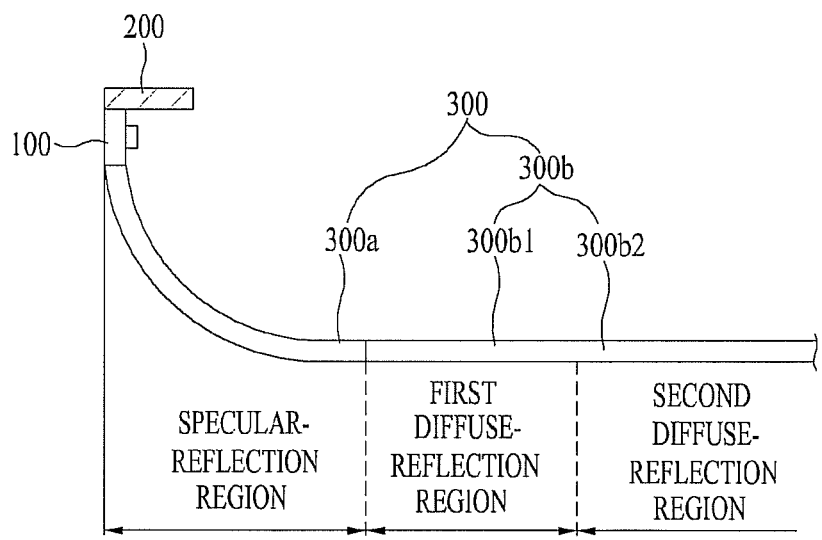
FIGS. 14A and 14B are explanatory views illustrating a light unit according to a third embodiment.
Figure 14B:
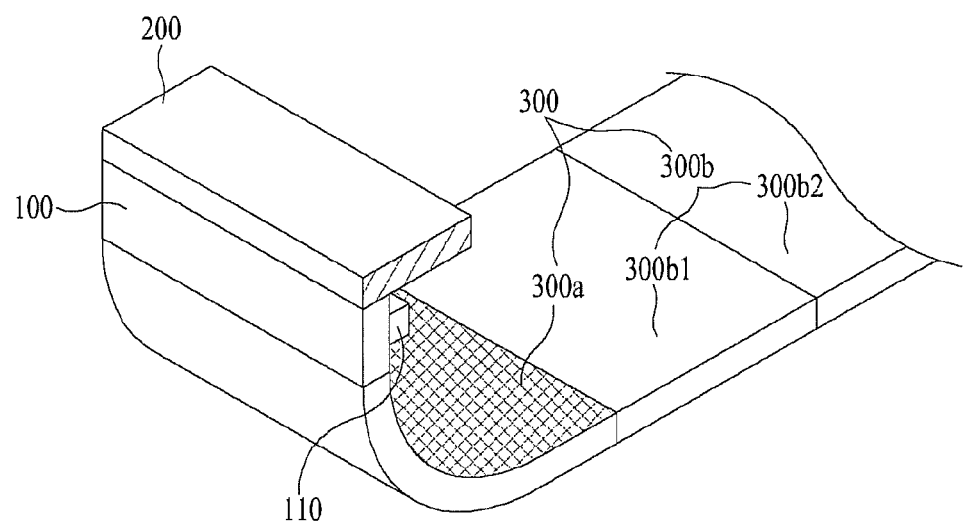

FIGS. 14A and 14B are explanatory views illustrating a light unit according to a third embodiment. FIG. 14A is a sectional view, and FIG. 14B is a top perspective view.

As illustrated in FIGS. 14A and 14B, the light unit may include the light source module 100 having the at least one light source 110, the top plate 200, and the bottom plate 300.

The bottom plate 300 may include the specular-reflection region 300a and the diffuse-reflection region 300b. The diffuse-reflection region 300b may include the first diffuse-reflection region 300b1 and the second diffuse-reflection region 300b2.

The specular-reflection region 300a may perform specular-reflection of incident light, and the diffuse-reflection region 300b may perform diffuse-reflection of incident light. Reflectivity of the specular-reflection region 300a and the diffuse-reflection region 300b may be in a range of about 50% to 99.99%.

The first and second diffuse-reflection regions 300b1 and 300b2 may include a first reflective pattern that reflects incident light via Lambertian distribution and a second reflective pattern that reflects incident light via Gaussian distribution.

Here, in the first diffuse-reflection region 300b1, a size of the first reflective pattern may be less than a size of the second reflective pattern. In the second diffuse-reflection region 300b2, a size of the first reflective pattern may be greater than a size of the second reflective pattern.

An area ratio of the first reflective pattern to the second reflective pattern may be in a range of about 1:1 to 1:5.

In this case, an area ratio of the specular-reflection region 300a to the first diffuse-reflection region 300b1 may be in a range of about 1:1 to 1:4, and an area ratio of the specular-reflection region 300a to the second diffuse-reflection region 300b2 may be in a range of about 1:1 to 1:20.

As described above, the reason for determining an area ratio of the specular-reflection region 300 to the first or second diffuse-reflection region 300b1 or 300b2 is to reduce a luminance difference between a region of the bottom plate 300 close to the light source module 100 and a region of the bottom plate 300 distant from the light source module 100.

That is, the entire bottom plate 300 may exhibit uniform luminance by appropriately adjusting an area ratio of the specular-reflection region 300a to the first or second diffuse-reflection region 300b1 or 300b2.

The first diffuse-reflection region 300b1 may be located between the specular-reflection region 300a and the second diffuse-reflection region 300b2.

That is, the specular-reflection region 300a of the bottom plate 300 may be located close to the light source module 100, the second diffuse-reflection region 300b2 of the bottom plate 300 may be located distant from the light source module 100, and the first diffuse-reflection region 300b1 of the bottom plate 300 may be located between the specular-reflection region 300a and the second diffuse-reflection region 300b2.

The reason for arranging the specular-reflection region 300a and the diffuse-reflection region 300b as described above is because the specular-reflection region 300a of the bottom plate 300, which is located close to the light source module 100, may serve to reflect light emitted from the light source module 100 to a central region of the bottom plate 300, and the diffuse-reflection region 300b of the bottom plate 300 located at a central region of the bottom plate 300 may serve to diffuse incident light.

Accordingly, in the third embodiment, similar to the aforementioned first and second embodiments, the specular-reflection region 300a of the bottom plate 300 may be obtained by polishing the bottom plate 300, to have specular-reflection characteristics, and the reflective patterns may be formed in the diffuse-reflection region 300b of the bottom plate 300 via a precise process, such as, for example, a masking process and an etching process, to have diffuse-reflection characteristics.

The light unit according to the present embodiment may further include an optical member spaced apart from the bottom plate by a predetermined distance, such that an air guide is defined between the bottom plate and the optical member.

Figure 15:
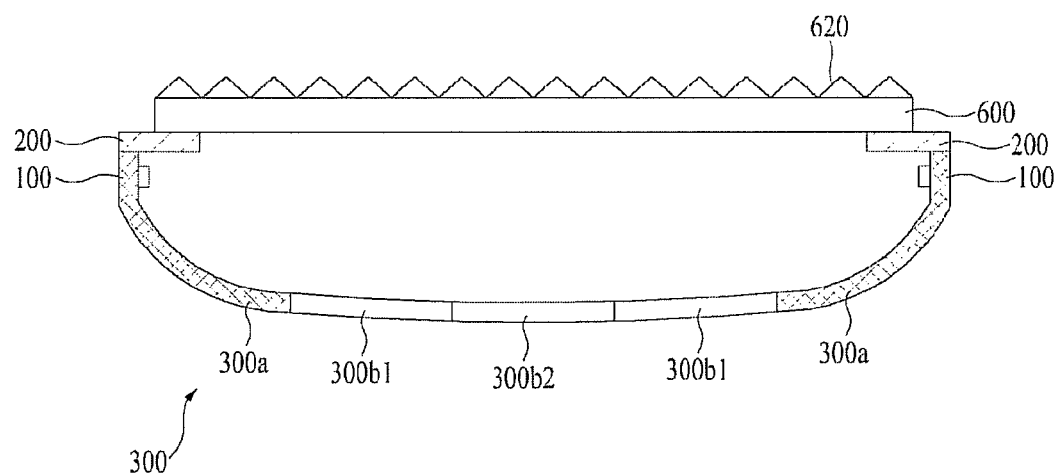
FIG. 15 is a view illustrating a light unit including an optical member.
Figure 16:
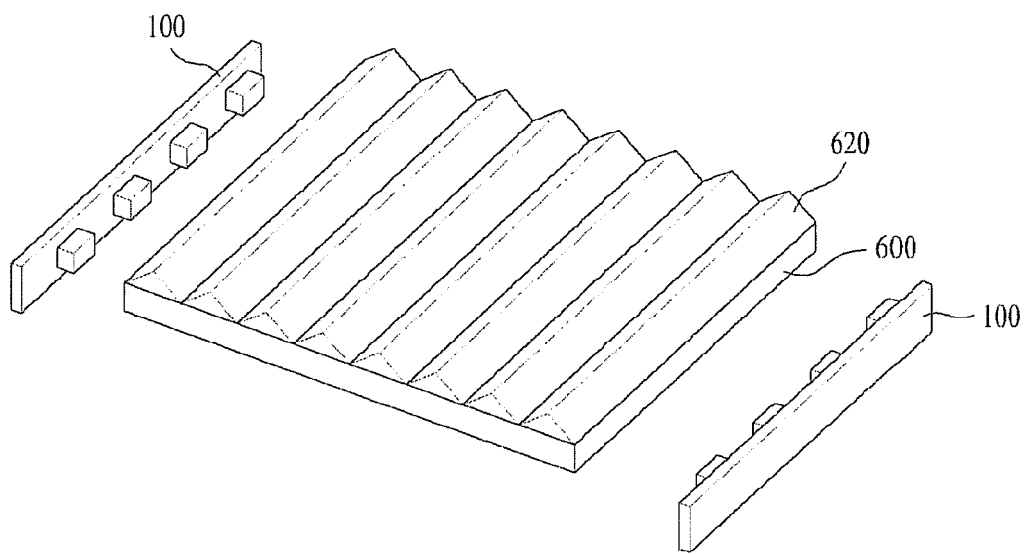
FIG. 16 is a view illustrating one example of the shape of the optical member.

FIG. 15 is a view illustrating the light unit including then optical member, and FIG. 16 is a view illustrating one example of the shape of the optical member.

As illustrated in FIG. 15, the optical member 600 may be located in an open region of the top plate 200, and may have a multilayer form. A roughened pattern 620 may be an uppermost layer or any one layer of the optical member 600.

As occasion demands, the optical member 600 may be formed of at least one sheet, which is selected from among a diffusion sheet, a prism sheet, a luminance-increasing sheet, and the like.

The diffusion sheet functions to diffuse light emitted from a light source, the prism sheet functions to guide diffused light to a light emitting region, and the luminance-increasing sheet functions to increase luminance.

The optical member 600 may serve to diffuse light emitted through the open region of the top plate 200. To increase diffusion effects, the roughened pattern 620 may be formed on an upper surface of the diffusion sheet 600.

The roughened pattern 620, as illustrated in FIG. 16, may have a stripe shape arranged along the first light source module 110.

In this case, the roughened pattern 620 may include ridges formed on the surface of the optical member 600. The respective ridges may have a first face and a second face facing each other, and an angle between the first face and the second face may be an acute angle or an obtuse angle.

As occasion demands, the optical member 600 may be formed of at least one sheet. More specifically, the optical member 600 may selectively include a diffusion sheet, a prism sheet, a luminance-increasing sheet, or the like.

The diffusion sheet functions to diffuse light emitted from a light source, the prism sheet functions to guide diffused light to a light emitting region, and the luminance-increasing sheet functions to increase luminance.

As described above, the light unit may provide higher uniform luminance owing to a plurality of patterns including concave and convex lines alternately arranged on a surface of the bottom plate.

Additionally, in the present embodiment, a light emission surface of the light source module may be oriented in various directions.

More specifically, the light source module may be a direct emitting type in which the light emission surface is oriented toward the air guide between the optical member and the bottom plate, or may be of an indirect emitting type in which the light emission surface is oriented toward any one of the top plate, the bottom plate and a cover plate.

Light emitted from the indirect emitting type light source module may be reflected from the top plate, the bottom plate and the cover plate, and in turn the reflected light may be directed toward the air guide of the light unit.

The reason for providing the indirect emitting type light source module is to reduce a hot spot phenomenon.

A plurality of reinforcing ribs may be arranged at a lower surface of the bottom plate.

Figure 17:
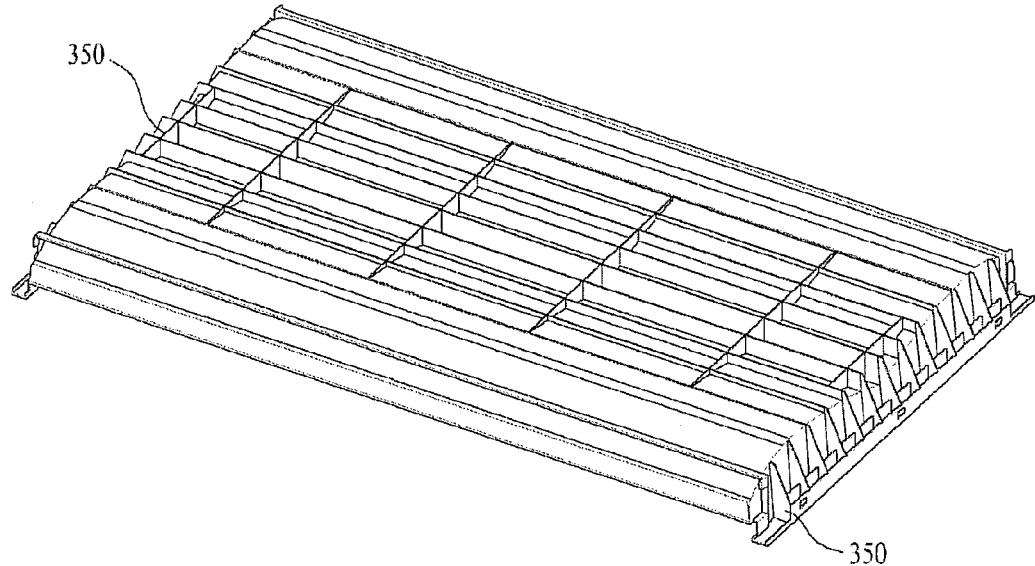
FIG. 17 is a view illustrating reinforcing ribs formed at a lower surface of the bottom plate.

FIG. 17 is a view illustrating the reinforcing ribs formed at the lower surface of the bottom plate. As illustrated in FIG. 17, a plurality of reinforcing ribs 350 may be arranged on the lower surface of the bottom plate.

The reinforcing ribs may serve to prevent deformation of the bottom plate because a curved reflective surface of the bottom plate may be easily deformed by external shock.

The reinforcing ribs 350 may be formed on the lower surface of the bottom plate opposite to the inclined surface of the bottom plate and on a lateral surface of the bottom plate.

A plurality of support pins may be formed on an upper surface of the bottom plate to support the optical member.

Figure 18:
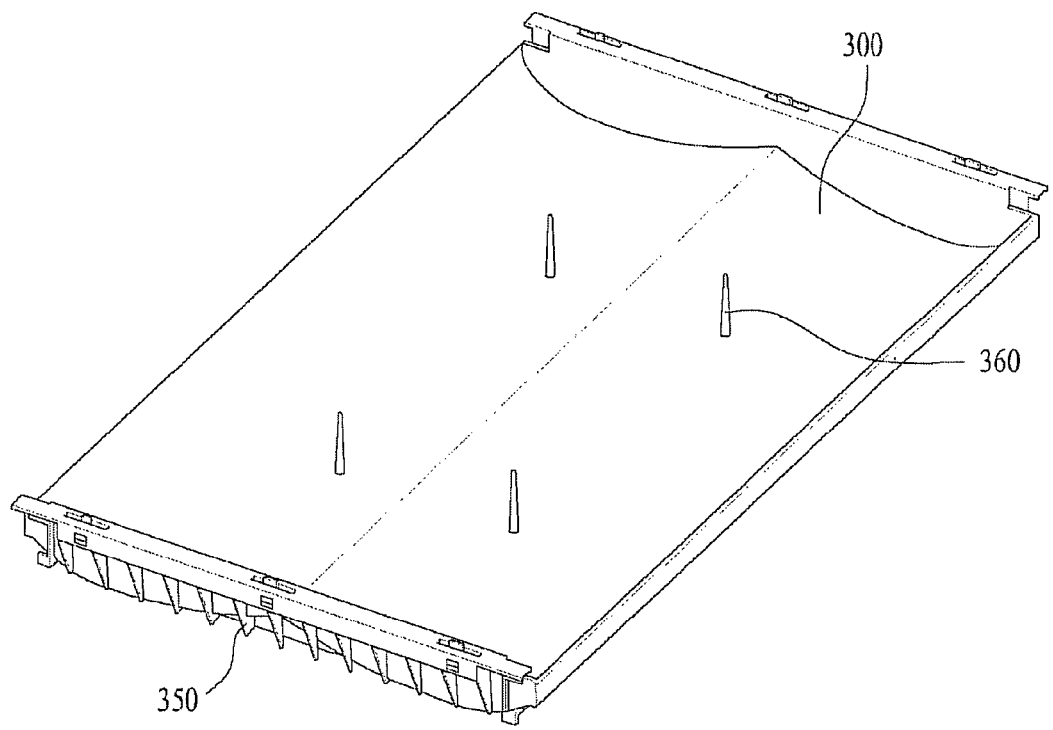
FIG. 18 is a view illustrating support pins formed at an upper surface of the bottom plate.

FIG. 18 is a view illustrating support pins formed on the upper surface of the bottom plate. As illustrated in FIG. 18, the support pins 360 to support the optical member may be formed on the upper surface of the bottom plate 300.

Since the optical member is spaced apart from the bottom plate 300 to define the air guide therebetween, a central region of the optical member may sag. Thus, the support pins 360 serve to support the sagged optical member.

The support pins 360 may have a stable configuration in which an area of a lower surface thereof coming into contact with the bottom plate 300 is greater than an area of an upper surface thereof.

Circuit devices to drive the light source module may be arranged under the inclined surface of the bottom plate.

A space is defined under the lower surface of the bottom plate between inclined surfaces of the bottom plate next to each other. Arranging the circuit devices in the corresponding space enables efficient space utilization.

Figure 19:
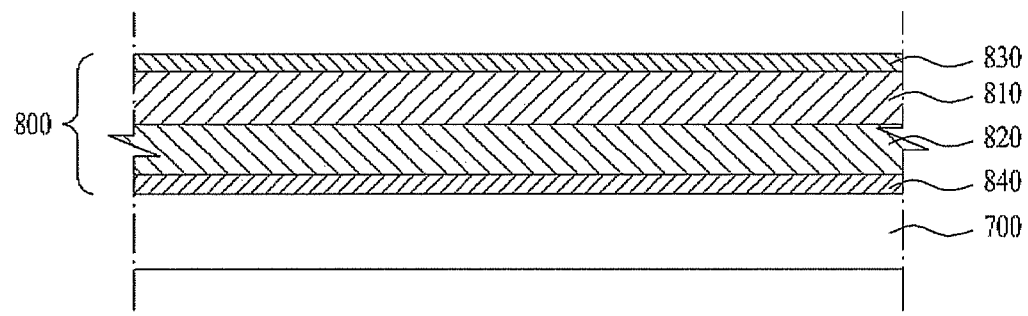
FIG. 19 is a view illustrating a display module including having a light unit according to an embodiment.

FIG. 19 is a view illustrating a display module having a light unit according to an embodiment.

As illustrated in FIG. 19, the display module 20 may include a display panel 800 and a light unit 700.

The display panel 800 may include a color filter substrate 810 and a Thin Film Transistor (TFT) substrate 820, which are bonded to face each other with a uniform cell gap therebetween. A liquid crystal layer (not shown) may be interposed between the two substrates 810 and 820.

An upper polarizer 830 and a lower polarizer 840 may respectively be provided at upper and lower sides of the display panel 800. More particularly, the upper polarizer 830 may be placed on an upper surface of the color filter substrate 810 and the lower polarizer 840 may be placed on a lower surface of the TFT substrate 820.

Although not illustrated, a gate and data drive unit may be provided at a lateral surface of the display panel 800, to generate drive signals required to drive the panel 800.

Figure 20:
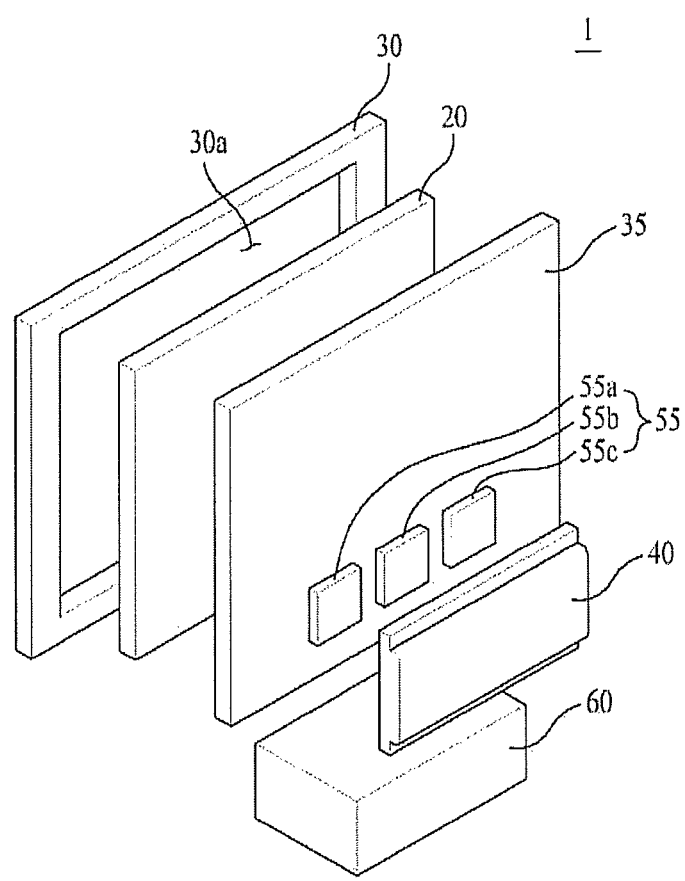
FIGS. 20 and 21 are views illustrating a display apparatus according to an embodiment.
Figure 21:
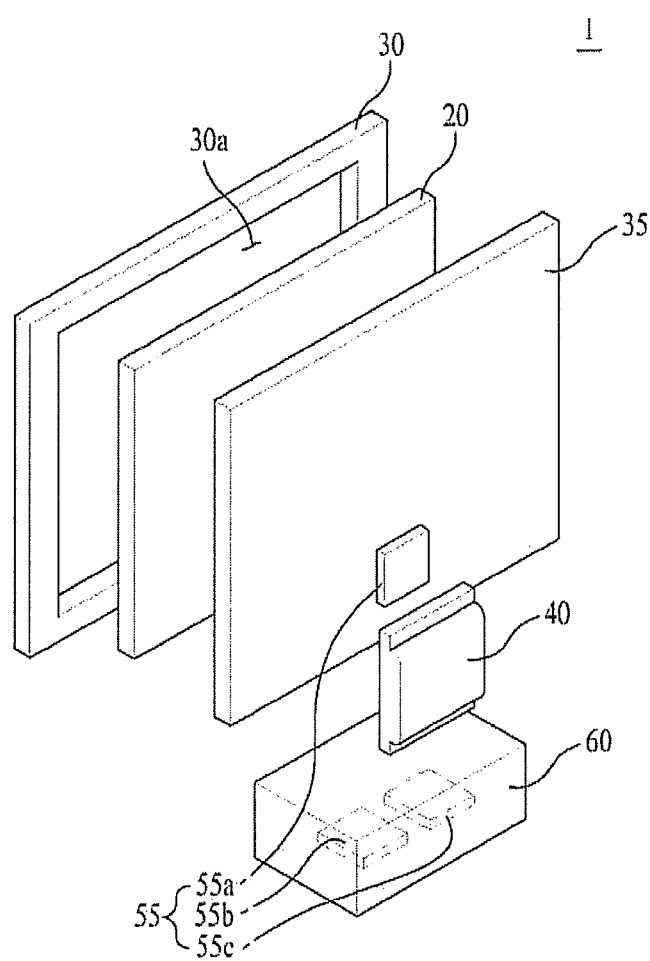

FIGS. 20 and 21 are views illustrating a display apparatus according to an embodiment.

Referring to FIG. 20, the display apparatus 1 may include the display module 20, a front cover 30 and a back cover 35 to surround the display module 20, a drive unit 55 provided at the back cover 35, and a drive unit cover 40 configured to surround the drive unit 55.

The front cover 30 may include a transparent front panel (not shown) to transmit light. The front panel serves to protect the display module 20 spaced apart therefrom by a predetermined distance and to transmit light emitted from the display module 20, allowing an image displayed on the display module 20 to be seen from the outside.

The back cover 35 may be coupled to the front cover 30 to protect the display module 20.

The drive unit 55 may be placed on a surface of the back cover 35.

The drive unit 55 may include a drive controller 55a, a main board 55b and a power supply board 55c.

The drive controller 55a may be a timing controller. The drive controller 55a serves to adjust an operation timing of each driver IC of the display module 20. The main board 55b may serve to transmit V-sync, H-sync and R, G and B resolution signals to the timing controller. The power supply board 55c supplies power to the display module 20.

The drive unit 55 may be attached to the back cover 35 and may be enclosed by the drive unit cover 40.

The back cover 35 has a plurality of holes, through which the display module 20 may be connected to the drive unit 55. Also, a stand 60 to support the display apparatus 1 may be provided.

In an alternative embodiment, as illustrated in FIG. 21, the drive controller 55a of the drive unit 55 may be provided at the back cover 35, whereas the main board 55b and the power supply board 55c may be provided in the stand 60.

The drive unit cover 40 may be configured to enclose only the drive unit 55 provided at the back cover 35.

Although the present embodiment illustrates the main board 55b and the power supply board 55c as being provided separately, they may be integrated with each other, and the disclosure is not limited thereto.

In other embodiments, a display apparatus, an indicator apparatus, and an illumination system, which include the top plate, the bottom plate having the specular-reflection region and the diffuse-reflection region, and the light source module as described in the aforementioned embodiments, may be realized. For example, the illumination system may include a lamp or a street lamp.

The illumination system may be used as an illumination lamp that generates light using a group of plurality of LEDs. In particular, the illumination system may serve as a built-in lamp (downlight) which is embedded in the ceiling or wall of a building such that an opening of a shade is exposed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light unit comprising:
a top plate;
a bottom plate; and
at least one light source module located between the top plate and the bottom plate,
wherein the bottom plate includes a specular-reflection region and a diffuse-reflection region,
wherein the diffuse-reflection region includes a first diffuse-reflection region and a second diffuse-reflection region, each of the first and second diffuse-reflection regions including a first reflective pattern that reflects incident light via Lambertian distribution and a second reflective pattern that reflects incident light via Gaussian distribution, wherein the first and second reflective patterns of each of the first and second diffuse-reflection regions are irregularly sized roughened patterns, and wherein in the first diffuse-reflection region, an area occupied by the first reflective pattern is smaller than an area occupied by the second reflective pattern, and in the second diffuse-reflection region, an area occupied by the first reflective pattern is larger than an area occupied by the second reflective pattern.

2. The light unit according to claim 1, wherein the diffuse-reflection region occupies 50~95% of an entire area of the bottom plate.

3. The light unit according to claim 1, wherein an area ratio of the specular-reflection region of the bottom plate to the diffuse-reflection region of the bottom plate is in a range of 1:1 to 1:20.

4. The light unit according to claim 1, wherein at least one of the first and second reflective patterns of the diffuse-reflection region includes irregularly-sized ridges.

5. The light unit according to claim 1, wherein a distance between the diffuse-reflection region of the bottom plate and the light source module is greater than a distance between the specular-reflection region of the bottom plate and the light source module.

6. The light unit according to claim 1, wherein the bottom plate includes at least one flat surface, and the flat surface of the bottom plate is parallel to the top plate.

7. The light unit according to claim 1, wherein the bottom plate includes at least two inclined surfaces having at least one inflection point, and first and second inclined surfaces, which are located next to each other about the inflection point, have different radii of curvature.

8. The light unit according to claim 1, further comprising an optical member spaced apart from the bottom plate by a predetermined distance, and an air guide is defined in a space between the bottom plate and the optical member.

9. A light unit comprising:
a top plate;
a bottom plate; and
at least one light source module located between the top plate and the bottom plate,
wherein the bottom plate includes a specular-reflection region, a diffuse-reflection region, and a mixed region in which a specular-reflection region and a diffuse-reflection region are mixed,
wherein the diffuse-reflection region includes a first diffuse-reflection region and a second diffuse-reflection region, each of the first and second diffuse-reflection regions including a first reflective pattern that reflects incident light via Lambertian distribution and a second reflective pattern that reflects incident light via Gaussian distribution, wherein the first and second reflective patterns of each of the first and second diffuse-reflection regions are irregularly sized roughened patterns, and
wherein, in the first diffuse-reflection region, an area occupied by the first reflective pattern is smaller than an area occupied by the second reflective pattern, and in the second diffuse-reflection region, an area occupied by the first reflective pattern is larger than an area occupied by the second reflective pattern.

10. The light unit according to claim 9, wherein the specular-reflection region of the mixed region occupies 5~50% of an entire area of the mixed region.

11. The light unit according to claim 9, wherein the mixed region is located between the specular-reflection region and the diffuse-reflection region.

12. The light unit according to claim 9, wherein an area of the specular-reflection region included in the mixed region decreases with increasing distance from the light source module.

13. The light unit according to claim 9, wherein an area of the specular-reflection region included in the mixed region close to the light source module is greater than an area of the specular-reflection region included in the mixed region distant from the light source module.

14. The light unit according to claim 9, wherein the specular-reflection region of the mixed region occupies 20~30% of an entire area of the mixed region.

15. The light unit according to claim 9, wherein an area ratio of the specular-reflection region to the diffuse-reflection region of the mixed region is in a range of 1:1 to 1:20.

16. A light unit comprising:
a top plate;
a bottom plate; and
at least one light source module located between the top plate and the bottom plate,
wherein the bottom plate includes a specular-reflection region and first and second diffuse-reflection regions,
wherein each of the first and second diffuse-reflection regions includes a first reflective pattern that reflects incident light via Lambertian distribution and a second reflective pattern that reflects incident light via Gaussian distribution, wherein the first and second reflective patterns of each of the first and second diffuse-reflection regions are irregularly sized roughened patterns,
wherein in the first diffuse-reflection region, an area occupied by the first reflective pattern is smaller than an area occupied by the second reflective pattern, and
wherein in the second diffuse-reflection region, an area occupied by the first reflective pattern is larger than an area occupied by the second reflective pattern.

17. The light unit according to claim 16, wherein an area ratio of the first diffuse-reflection region to the second diffuse-reflection region is in a range of 1:1 to 1:5.

18. The light unit according to claim 16, wherein an area ratio of the specular-reflection region of the bottom plate to the first diffuse-reflection region is in a range of 1:1 to 1:4.

19. The light unit according to claim 16, wherein an area ratio of the specular-reflection region of the bottom plate to the second diffuse-reflection region is in a range of 1:1 to 1:20.

20. The light unit according to claim 16, wherein the first diffuse-reflection region is located between the specular-reflection region and the second diffuse-reflection region.

* * * * *